United States Patent [19]

Johnston

[11] Patent Number: 4,983,785
[45] Date of Patent: Jan. 8, 1991

[54] ELECTRICAL WIRING BOX WITH STRUCTURE FOR FAST DEVICE MOUNTING

[75] Inventor: Earl S. Johnston, Mineral Wells, W. Va.

[73] Assignee: Challenger Electrical Materials, Inc., Malvern, Pa.

[21] Appl. No.: 318,106

[22] Filed: Mar. 2, 1989

Related U.S. Application Data

[63] Continuation-in-part of Ser. No. 279,481, Dec. 2, 1988, abandoned.

[51] Int. Cl.$^5$ .............................................. H02G 3/08
[52] U.S. Cl. ........................................ 174/53; 220/3.2
[58] Field of Search ...................... 174/53; 220/3.2, 3.3

[56] References Cited

U.S. PATENT DOCUMENTS

| | | | |
|---|---|---|---|
| 2,775,916 | 1/1957 | Baxter et al. | 411/427 |
| 3,876,821 | 4/1975 | Pringle | 174/53 |
| 4,105,862 | 8/1978 | Hoehn | 174/53 |
| 4,130,335 | 12/1978 | Kinney | 439/535 |
| 4,580,689 | 4/1986 | Slater | 220/3.2 |
| 4,666,055 | 5/1987 | Lewis | 220/3.2 |
| 4,728,236 | 3/1988 | Kraus | 411/437 |

Primary Examiner—Gerald P. Tolin
Assistant Examiner—D. A. Tone
Attorney, Agent, or Firm—G. H. Telfer

[57] ABSTRACT

An electrical wiring box of molded insulating material is provided with bosses having screw holes for receiving a mounting screw that include two colinear portions of which a first portion proximate the front surface has an internal configuration, such as molded threads, that engage the mounting screw while permitting the mounting screw to be manually inserted therethrough without turning because of flexibility built into the boss structure. A second portion of the screw hole is of greater restriction for securely engaging the screw such as by self tapping. The flexibility of the boss is provided by a first center slot that extends from the screw hole to the boss exterior over a length substantially equal to the first portion of the screw hole. Second and third slots are located respectively on each side of the screw hole and provide projections respectively between the first and second slots and the first and third slots that flex to allow easy screw insertion through the first portion of the screw hole.

15 Claims, 3 Drawing Sheets

ELECTRICAL WIRING BOX WITH STRUCTURE FOR FAST DEVICE MOUNTING

CROSS-REFERENCE TO RELATED APPLICATION

This application is a continuation-in-part of application Ser. No. 07/279,481, filed Dec. 2, 1988, now abandoned.

BACKGROUND OF THE INVENTION

This invention relates to electrical wiring box structures and particularly to those of molded insulating material with special means for securing device mounting screws.

Electrical wiring boxes of insulating materials such as polyvinylchloride have been made and used with a variety of screw mounting means for securing devices within the box. In general, the approaches taken have suffered from either one of two drawbacks. One is that device installation time is undesirably long if the installer must drive a screw through an untapped bore hole. On the other hand, a tapped bore hole is undesirably expensive to make and may not provide the degree of mechanical security needed. This has led to the adoption of various kinds of metallic inserts within the bore hole that facilitate device mounting. One such example is that of Kinney U.S. Pat. No. 4,130,335, Dec. 19, 1978, which is herein incorporated by reference for its discussion of the general problem of achieving quick and easy mounting of devices within wiring boxes and previously proposed solutions thereto.

Among the objectives of this invention are economy, by avoiding a need of extra parts such as insertable metal clips. Another objective is security of holding devices by having the mounting arrangement include both very tight and secure gripping of the mounting screw. Use of some metal clips has the drawback of not giving a tight arrangement. The insertion of the screw may result in it being relatively secure against withdrawal but still not susceptible to being firmly tightened because the screw will continue to turn past the gripping elements of the metal clip. A further objective is fast assembly. The arrangement should be such as to allow rapid assembly.

SUMMARY OF THE INVENTION

In accordance with the present invention an electrical wiring box of molded insulating material has the usual bosses integrally formed with the walls of the box. A boss has a screw hole for receiving a mounting screw and the screw hole has two colinear portions of which a first portion proximate the front of the box has an internal configuration that engages the mounting screw while permitting the mounting screw to be manually inserted therethrough without turning. This first portion of the screw hole is provided by having, in one example, molded threads that provide gripping of the screw so that it cannot be withdrawn very readily. The mounting screw can be inserted without turning because of a flexibility built into the structure by a configuration of slots. A first slot communicates with the screw hole and second and third slots are substantially parallel and provide hinged projections respectively between the first and second slots and the first and third slots that flex to allow easy screw insertion through the first portion of the screw hole. A second colinear portion of the screw hole has a greater restriction, or smaller diameter, for securely engaging the screw. This second portion may be merely an untapped hole that will require turning of the screw to provide self-tapping for a few turns.

Preferably the first screw hole portion extends a greater length than the second screw hole portion so that a substantial part of a screw can be manually inserted by direct axial force through the first screw hole portion and then with only a few turns the screw is screwed through the second portion of the screw hole.

The device of the invention achieves economy because no extra parts such as metal clips are required and the entire structure can be formed in a simple molding operation. Both fast assembly and a high degree of both tightness and security are achieved. Furthermore, the device in accordance with the invention is useful by installers who choose to use either of two modes of installation. Installers who prefer to use a screwdriver, such as a power screwdriver, to drive a screw by turning through the complete length of the screw hole will find the device very suitable for that purpose. Otherwise, installers who wish to insert a screw directly by forcing it longitudinally through a major portion of the screw hole with only a few turns left for tightening will find it equally useful and effective.

DESCRIPTION OF PREFERRED EMBODIMENTS

Figure 1:
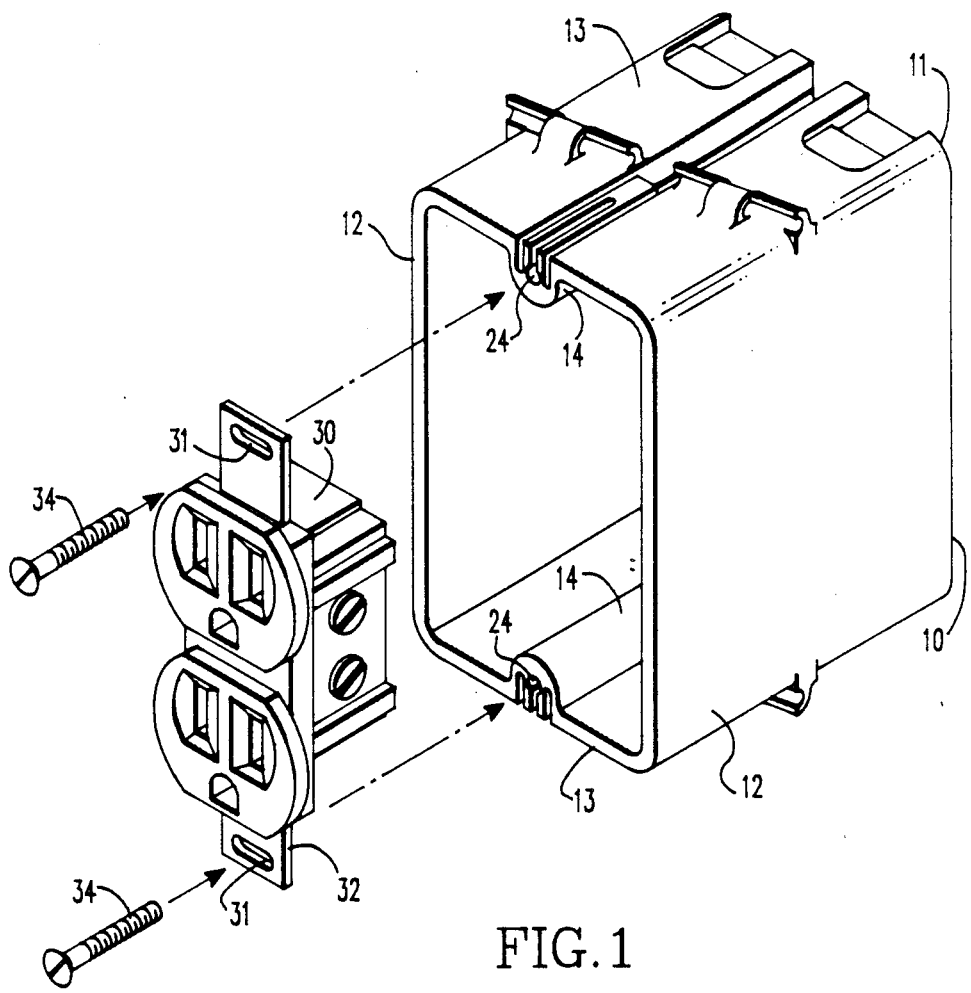
FIG. 1 is an exploded view illustrating an electrical wiring box provided with mounting elements in accordance with the present invention for mounting an electrical device within the box.

Referring now to FIG. 1, there is shown in an exploded perspective view an arrangement of an electrical wiring box 10 of electrical insulating material. The box 10 may be of polyvinylchloride or another insulating material. The box 10 has a bottom 11, two side walls 12 and two end walls 13. Integrally molded with the end walls 13 are respective bosses 14 which contain screw holes 24. An electrical wiring device 30 such as a duplex receptacle is mounted in the wiring box 10 by screws 34 that pass through apertures 31 in a mounting yoke 32 of the wiring device into the screw holes 24 provided in the bosses 14. For purposes of this invention the boss 14 may be formed either on the interior or the exterior of a wiring box wall.

Figure 5:
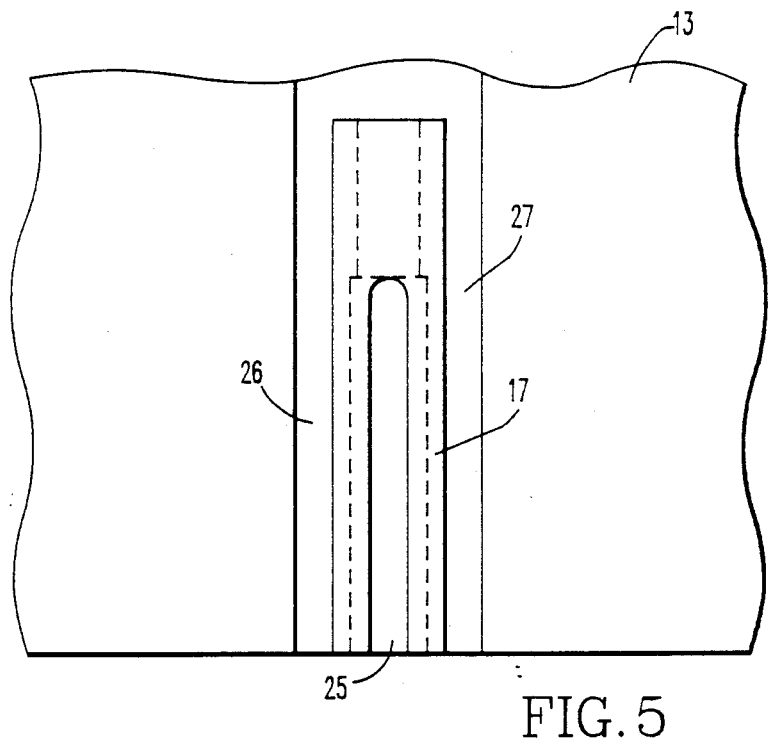
FIG. 4 is a sectional view substantially like that of FIG. 3 with an inserted screw for holding a device and FIG. 5 is an elevation view of a boss such as that of FIG. 2.
Figure 2:
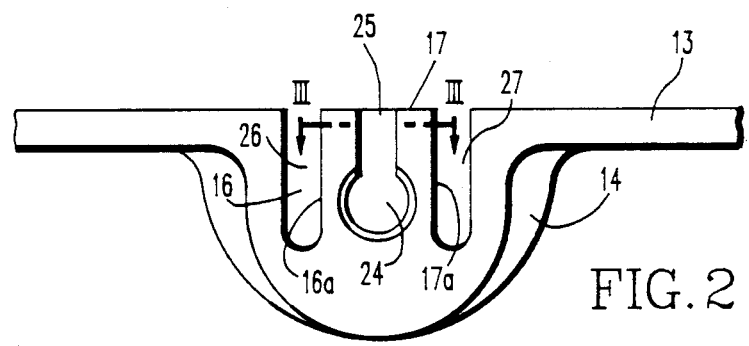
FIG. 2 is an enlarged plan view of a boss of a wiring box such as that of FIG. 1.
Figure 3:
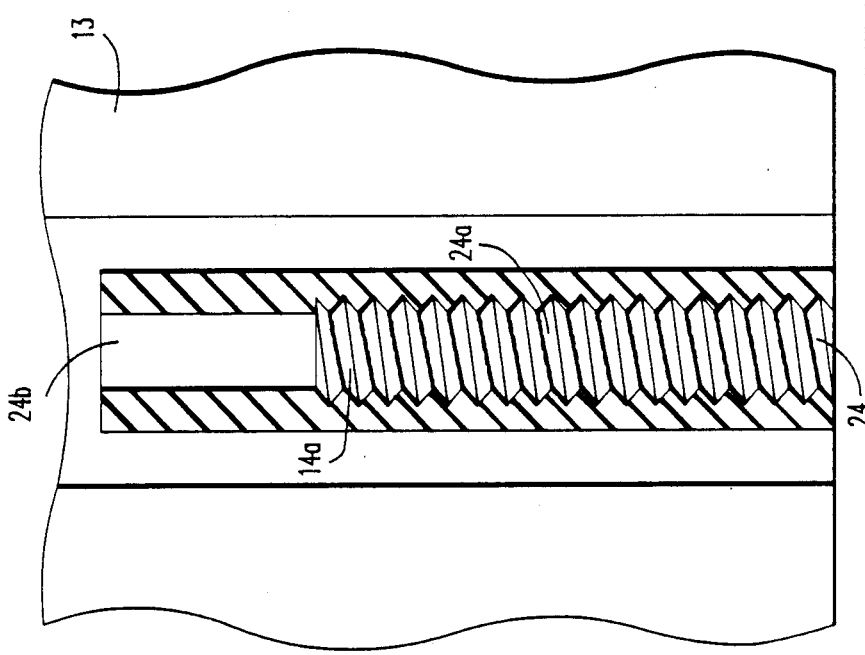
FIG. 3 is a sectional view of the boss of FIG. 2 taken along line III—III.

The configuration of the bore hole or screw hole 24 and boss 14 can best be seen by reference to FIGS. 2, 3 and 5. The screw holes 24 have a configuration of two colinear portions 24a and 24b. A first portion 24a near the front of the box is configured to allow a screw 34 to be inserted without turning although gripped by a configuration 14a such as threads within that portion and a second colinear portion 24b of the screw hole 24 is more restricted and requires turning of a screw to form a self-tapped hole tightly gripping the screw.

There is a center slot 25 communicating from the exterior of the boss 14 to the first portion 24a of the screw hole. This first portion 24a includes threads 14a, or the like, integrally molded with the box in manufacture, that engage the screw. The second portion 24b of the screw hole as manufactured has no threads, or the like, and requires that a screw used therein self-tap the plastic material of the box.

The center slot 25 has, parallel with it, second and third slots 26 and 27 that are spaced from it by a short distance to leave projections 16 and 17 respectively between the first and second slots 25 and 26 and the first and third slots 25 and 27 symmetrically about the first slot 25. These projections 16 and 17 extend back to the screw hole 24 and have portions 16a and 17a that serve as hinges about which the projections flex as a screw is forced into the hole.

As seen in FIG. 1., the center slot 25 is confined to the part of the boss 14 containing the first portion 24a of the screw hole. The other slots 26 and 27 are formed in at least that part of the boss but may extend further, as shown by way of example.

Figure 4:
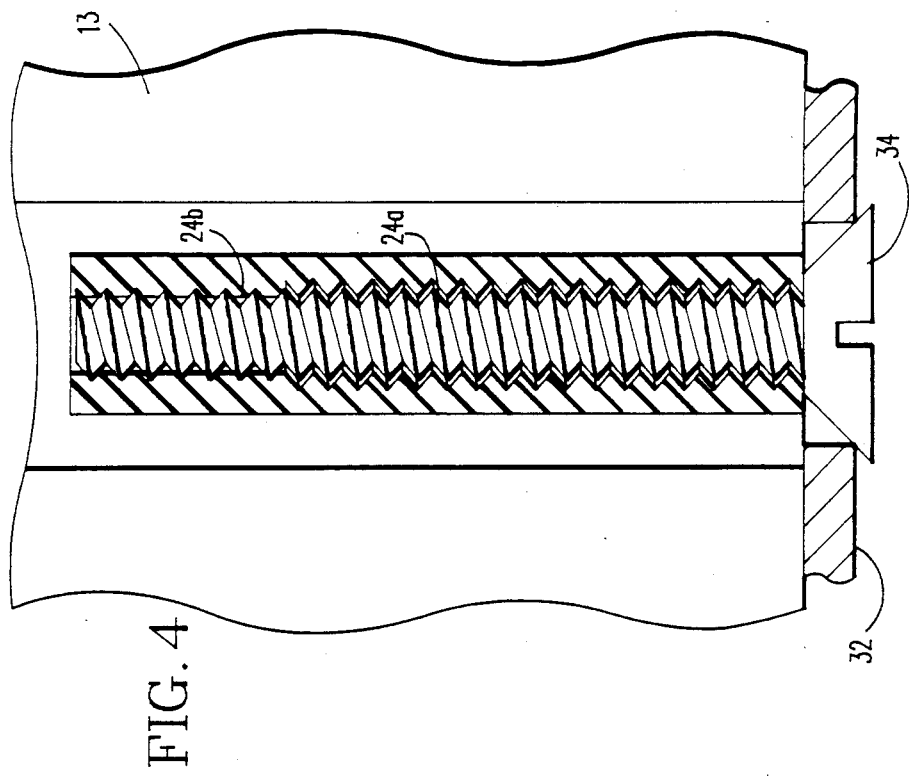

FIG. 4 shows the arrangement of FIG. 3 after a screw 34 has been inserted so that it holds a device (by yoke 32) in relation to the box. The first portion 24a of the screw hole engages the screw threads 14a in the manner of a threaded hole. The second portion 24b of the screw hole is threaded by the screw 34 itself.

In this embodiment, on the center line location of the device mounting screw at each end of the box 10, the configuration is formed to provide a quick and easy insertion of the mounting screw 34 and to obtain a rigid assembly of the device to the outlet box by the extra turns through the second portion 24b of the screw hole.

By way of example, hole 24 sized for a #6-32 device screw and having shallow #6-32 threads 14a formed on its interior over portion 24a is located on the device screw center line through the first portion 24a of the screw hole. The threads 14a are shallow in that they are formed, as molded with the rest of the box 10, with slightly lower crests then would be used if they were intended to firmly engage the screw. At a depth of approximately 0.6 inch, the threads stop and the diameter of this hole is reduced in size for remaining portion 24b of approximately 0.2 inch depth.

The open center slot 25 is the same depth as the hole portion 24a with the threads formed in it and extends from the side of the screw hole to the outside end of the electrical box. This slot is located on the device screw center line.

The two additional slots 26 and 27, one on each side of the screw hole 24, have a depth of approximately ½ inch, or more, from the front of the box and extend from the point approximately 1/16 inch past the screw hole to the outside end of the electrical box.

These slots 26 and 27 are located in a position to form a projection 16 and 17 on each side of the screw hole 24 and the center slot 25. The cross-section of the projection, tangentially to the screw hole, is a reduced thickness to form a hinge 16a and 17a. The hinges allow the projections to flex.

When mounting a device 30 into the electrical box 10, the device screw 34 is inserted through the device into the device screw hole 24. Pressure is applied in a straight line to force the device screw 34 through the device screw hole 24. As the screw 34 is pushed through the hole 24, it applies pressure against the shallow screw threads 14a causing the two projections 16 and 17 to flex in their hinged areas 16a and 17a, and allows the screw to pass. The screw 34 continues to enter the hole 24 until the tip contacts the reduced diameter portion 24b. At this point pressure is increased on the screw and it is rotated by hand in a clockwise direction. The screw 34, acting as a tap, cuts its own thread into the hole. The screw is rotated until sufficient torque is obtained to hold the device in the electrical box. Approximately 2 to 5 revolutions are required to tighten the assembly in a typical case.

The shallow thread form 14a may be replaced with a different type of cam which will cause the two projections to flex and allow the screw to pass. That is, the configuration 14a within the top portion 24a of the screw hole 24 need not be screw threads matching those of the screw but could be other molded projections that grip the screw yet allow it to be manually inserted longitudinally.

While the device in accordance with the preferred embodiment of the invention allows the insertion of the screw 34 through the first portion 24a of the screw hole 24 by direct linear application, with a final snugging by self-tapping through portion 24b, it is also useful as a threaded hole in which any installer who wants to may utilize a screw driver to drive the screw throughout both screw hole portions 24a and 24b. Thus the box in accordance with the present invention can serve as a product supplying needs met by only a plurality of previous products.

The first portion 24a of the screwhole 24 has molded threads or other molded configurations for screw retention. However, the threads or other configurations 14a need not occur throughout the entirety of the first portion 24a. It may, for example, have a shallow (such as about 0.1 in.) lead-in region at its top opening with no threads or the like. The lead-in region (not shown) facilitates starting a screw being turned into the screw hole and has been previously used with molded boxes having threaded bosses. Also, the threads or other molded configurations do not necessarily extend around the complete circumference of the first portion 24a. For example, they may extend around only about half the circumference, if desired. The threads may thus be only half threads occurring on the wall of the bore hole in portion 24a, such as on a 180° wall area opposite slot 25.

It will be understood that further changes and modification may be made in accordance with the general teachings of the present invention.

I claim:
1. An electrical wiring box, of molded insulating material and designed for rapid and secure mounting of a device in the box, comprising:
   a boss integrally formed with a wall of the box and having a screw hole for receiving a predetermined size mounting screw at a front surface of said boss,
   said screw hole having two colinear portions of which a first portion proximate said front surface has an internal configuration that engages the mounting screw while permitting the mounting screw to be longitudinally inserted therethrough without turning and a second portion of greater restriction for securely engaging the screw,
   said boss having a first center slot extending from said screw hole to the boss exterior over a length substantially equal to said first colinear portion of said screw hole, second and third slots located respectively on each side of, and spaced from said screw hole, said first, second and third slots being substantially parallel, and providing hinged projections respectively between said first and second slots and said first and third slots that flex to allow easy screw insertion through said first portion of said screw hole.

2. An electrical outlet box in accordance with claim 1 wherein:
said internal configuration of said first screw hole portion comprises screw threads for the mounting screw.

3. An electrical outlet box in accordance with claim 1 wherein:
said second screw hole portion of greater restriction is sized to require self tapping by the mounting screw.

4. An electrical outlet box in accordance with claim 1 wherein:
said first screw hole portion extends a greater length than said second screw hole portion.

5. An electrical outlet box in accordance with claim 4 in further combination with a mounting screw whose length is such that said first portion of said screw hole is at least about one-half thereof and said screw hole has an overall length approximately equal to that of said mounting screw.

6. An electrical wiring box comprising:
a bottom, two side walls and two end walls, all of insulating material, with a fastener boss integrally molded with each of the end walls;
each fastener boss has a screw hole with two colinear portions extending through first and second boss portions of which the first portion has integrally molded, shallow, screw threads sized to lightly engage a predetermined size screw for mounting a wiring device in the box and the second portion has an untapped bore hole sized to require turning of the screw to form a self-tapped hole;
the first boss portion has means for flexing the material of the first boss portion and allowing the screw to be inserted linearly without turning, the means for flexing comprising at least one slot into the boss.

7. An electrical wiring box in accordance with claim 6 wherein:
the means for flexing the material of the first boss portion comprises a center slot communicating from the exterior of the boss, on the exterior of the box, to the screw hole and the slot extends the length of the first boss portion and terminates at a location at which the second boss portion begins.

8. An electrical wiring box in accordance with claim 7 wherein:
the fastener boss is located on the interior of the respective end wall;
the means for flexing further comprises two other slots from the exterior of the box parallel with the center slot and spaced from the center slot a short distance to leave projections of boss material between the slots symmetrically about the center slot; and
the projections extend back to the screw hole and have portions immediately adjacent the screw hole of reduced thickness to serve as hinges about which the projections flex as a screw is inserted linearly in the hole.

9. An electrical wiring box in accordance with claim 8 wherein:
the insulating material of the box is polyvinylchloride.

10. An electrical wiring box in accordance with claim 9 wherein:
the first and second boss portions are together substantially coextensive in length with the mounting screw;
the first boss portion has a shallow lead-in region with no threads so as to facilitate starting a screw being turned into the screw hole;
the second boss portion has a screw hole length to require approximately two to five screw revolutions for final tightening.

11. An electrical wiring box in accordance with claim 10 wherein:
the first boss portion has the screw threads on about half the circumference of the screw hole surface opposite the center slot.

12. An electrical wiring box in accordance with claim 7 wherein:
the first boss portion has the screw threads on about half the circumference of the screw hole surface opposite the center slot and the first and second boss portions are together substantially coextensive in length with the mounting screw.

13. An electrical wiring box in accordance with claim 6 wherein:
the first boss portion has the screw threads on the screw hole surface around the complete circumference of adjacent boss material.

14. An electrical wiring box in accordance with claim 6 wherein:
the first boss portion has the screw threads on the screw hole surface around less than the complete circumference of the adjacent boss material.

15. An electrical wiring box in accordance with claim 14 wherein:
the first boss portion has the screw threads on about half the circumference of the screw hole surface.

* * * * *